United States Patent
Zhang (10) Patent No.: US 12,250,717 B2
(45) Date of Patent: Mar. 11, 2025

(54) WIRELESS COMMUNICATION METHOD, USER EQUIPMENT, AND BASE STATION FOR POWER CONSUMPTION REDUCTION IN ENERGY MEASUREMENT

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 386 days.

(21) Appl. No.: 17/738,911

(22) Filed: May 6, 2022

(65) Prior Publication Data
US 2022/0264642 A1  Aug. 18, 2022

Related U.S. Application Data

(63) Continuation of application No. PCT/CN2020/130157, filed on Nov. 19, 2020.
(Continued)

(51) Int. Cl.
*H04W 74/0808* (2024.01)
*H04W 24/08* (2009.01)

(52) U.S. Cl.
CPC ....... *H04W 74/0808* (2013.01); *H04W 24/08* (2013.01)

(58) Field of Classification Search
CPC ............. H04W 74/0808; H04W 24/08; H04W 74/002; H04W 74/0833; H04W 74/006
See application file for complete search history.

(56) References Cited

U.S. PATENT DOCUMENTS

2017/0099667 A1*  4/2017  Dinan ................. H04W 74/006
2017/0318607 A1*  11/2017  Tiirola .................... H04W 4/10
(Continued)

FOREIGN PATENT DOCUMENTS

| CN | 109076601 A | 12/2018 |
|---|---|---|
| CN | 109417792 A | 3/2019 |
| WO | 2019217697 A1 | 11/2019 |

OTHER PUBLICATIONS

WO 2019/221443 A1 (Year: 2019).*
(Continued)

*Primary Examiner* — Rushil P. Sampat
(74) *Attorney, Agent, or Firm* — BAYES PLLC (57) ABSTRACT

A wireless communication method, user equipment (UE), and base station for power consumption reduction in energy measurement are provided. The method by a user equipment (UE) includes being configured with a gap by a base station, wherein the gap comprises a first slot and a second slot after the first slot in time domain and performing a listen before talk (LBT) by performing a measurement in a part of at least one of the first slot and the second slot. This can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

20 Claims, 4 Drawing Sheets

Related U.S. Application Data (60) Provisional application No. 62/937,496, filed on Nov. 19, 2019.

(56) References Cited

U.S. PATENT DOCUMENTS

| 2018/0069653 | A1 | 3/2018 | Fujishiro et al. |
| 2018/0323935 | A1 | 11/2018 | Yerramalli et al. |
| 2021/0274549 | A1* | 9/2021 | Park ............... H04W 74/0808 |

OTHER PUBLICATIONS

The Notice of Allowance dated Jan. 29, 2024 from Chinese patent application No. 202211116550.0.
Supplementary European Search Report Dated Oct. 28, 2022., from the European Patent Application No. 20888947.7, 11 pages.
Nokia et al: "Channel access and co-existence for NR-U operation", 3GPP Draft; R1-1912257, 3rd Generation Partnership Project (3GPP), Mobile Competence Centre; 650, Route Des Lucioles; F-06921 Sophia-Antipolis Cedex; France, vol. RAN WG1, No. Reno, US; Nov. 18, 2019-Nov. 22, 2019, Nov. 8, 2019, 9 pages.
Ericsson: "DL signals and channels for NR-U", 3GPP Draft; R1-1912707, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019, 25 pages.
EricssonN: "Channel access procedures", 3GPP Draft; R1-1910947 Channel Access Procedures, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 8, 2019, 8 pages.
OPPO: "Channel access procedure for NR-U", 3GPP Draft; R1-1912506, 3rd Generation Partnership Project (3GPP), Mobile Competence Centre; 650, Route Des Lucioles; F-06921 Sophia-Antipolis Cedex; France, vol. RN WG1, No. Reno, USA; Nov. 18, 2019-Nov. 22, 2019, Nov. 9, 2019, 17 pages.
International Search Report and the Written Opinion Dated Jan. 21, 2021 From the International Searching Authority Re. Application No. PCT/CN2020/130157, 9 pages.
The First Office Action dated Jul. 22, 2023 from Chinese patent application No. 202211116550.0.
The Second Office Action dated Oct. 20, 2023 from Chinese patent application No. 202211116550.0.

* cited by examiner

WIRELESS COMMUNICATION METHOD, USER EQUIPMENT, AND BASE STATION FOR POWER CONSUMPTION REDUCTION IN ENERGY MEASUREMENT

CROSS-REFERENCE TO RELATED APPLICATION

This is a continuation of an International Application No. PCT/CN2020/130157, filed on Nov. 19, 2020, entitled "APPARATUS AND METHOD OF WIRELESS COMMUNICATION", which claims the benefit of priority to U.S. provisional application No. 62/937,496 filed on Nov. 19, 2019, the contents of which are incorporated herein by reference in their entireties.

BACKGROUND

The present disclosure relates to the field of communication systems, and more particularly, to an apparatus and a method of wireless communication, which can provide a good communication performance and/or high reliability.

An unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum.

For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability. An LBT is also called a channel access procedure. UE performs the channel access procedure before the transmission, if the channel access procedure is successful, i.e., the channel is sensed to be idle, the UE starts to perform the transmission. If the channel access procedure is not successful, i.e., the channel is sensed to be not idle, the UE cannot perform the transmission.

Therefore, there is a need for an apparatus (such as a user equipment (UE) and/or a base station) and a method of wireless communication, which can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

SUMMARY

An object of the present disclosure is to propose an apparatus (such as a user equipment (UE) and/or a base station) and a method of wireless communication, which can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

In a first aspect of the present disclosure, a method of wireless communication by a user equipment (UE), comprising being configured with a gap by a base station, wherein the gap comprises a first slot and a second slot after the first slot in time domain and performing a listen before talk (LBT) by performing a measurement in a part of at least one of the first slot and the second slot.

In a second aspect of the present disclosure, a method of wireless communication by a base station comprising configuring a gap to a user equipment (UE), wherein the gap comprises a first slot and a second slot after the first slot in time domain and controlling the UE to perform a listen before talk (LBT) by performing a measurement in a part of at least one of the first slot and the second slot.

In a third aspect of the present disclosure, a user equipment comprises a memory, a transceiver, and a processor coupled to the memory and the transceiver. The processor is configured with a gap by a base station, the gap comprises a first slot and a second slot after the first slot in time domain. The processor is configured to perform a listen before talk (LBT) by performing a measurement in a part of at least one of the first slot and the second slot.

In a fourth aspect of the present disclosure, a base station comprises a memory, a transceiver, and a processor coupled to the memory and the transceiver. The processor is configured to configure a gap to a user equipment (UE), the gap comprises a first slot and a second slot after the first slot in time domain. The processor is configured to control the UE to perform a listen before talk (LBT) by performing a measurement in a part of at least one of the first slot and the second slot.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In an unlicensed band, a recent new radio unlicensed spectrum (NRU) agreement concludes that a downlink channel occupancy time (COT) initiated by a base station can be shared with a user equipment (UE) for uplink transmission. The UE can perform a quick listen before talk (LBT), i.e. LBT category 1 (immediate transmission without LBT) if the base station creates a gap up to 16 μs. The UE can also perform an LBT category 2 (one shot LBT) if the base station creates a gap having a duration of 16 μs or 25 μs. When the 16-μs LBT category 2 is used, the way of doing an LBT category 2 with 16-μs gap is not defined.

Some embodiments of the present disclosure provide methods of implementing an LBT category 2 with 16-μs gap.

Furthermore, an LBT is also called a channel access procedure. At least for the case where a downlink (DL) burst follows a uplink (UL) burst within a gNB-initiated channel occupancy time (COT) and there is no gap larger than 25 μs between any two transmissions in the COT, the channel access schemes in Table 1 apply for the DL burst following a UL burst. Note: a DL burst is defined as a set of transmissions from a given gNB having no gaps or gaps of no more than 16 μs. Transmissions from a gNB having a gap of more than 16 μs are considered as separate DL bursts.

TABLE 1

Channel access schemes for a DL burst follows a UL burst within a gNB-initiated COT as LBE device

| Category (Cat) 1 Immediate transmission | Cat 2 LBT |
| --- | --- |
| When the gap from the end of the scheduled UL transmission to the beginning of the DL burst is up to 16 μsec | When the gap from the end of the scheduled UL transmission to the beginning of the DL burst is larger than 16 μsec but not more than 25 μsec |

Furthermore, channel access schemes for NR-based access for unlicensed spectrum can be classified into the following categories:

Category 1: Immediate transmission after a short switching gap

This is used for a transmitter to immediately transmit after a switching gap inside a COT. The switching gap from reception to transmission is to accommodate the transceiver turnaround time and is no longer than 16 μs.

Category 2: LBT without random back-off

The duration of time that the channel is sensed to be idle before the transmitting entity transmits is deterministic.

Category 3: LBT with random back-off with a contention window of fixed size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

Figure 1:
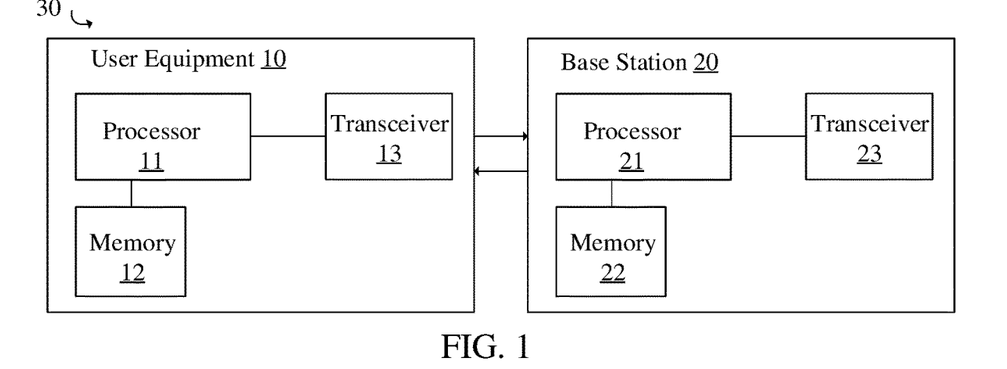
FIG. 1 is a block diagram of one or more user equipments (UEs) and a base station of wireless communication in a communication network system according to an embodiment of the present disclosure.

FIG. 1 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals.

When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured with a gap by the base station 20, the gap comprises a first slot and a second slot after the first slot in time domain. The processor 11 is configured to perform a listen before talk (LBT) by performing a measurement in a part of at least one of the first slot and the second slot. This can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

In some embodiments, the processor 21 is configured to configure a gap to the UE 10, the gap comprises a first slot and a second slot after the first slot in time domain. The processor 21 is configured to control the UE 10 to perform a listen before talk (LBT) by performing a measurement in a part of at least one of the first slot and the second slot. This can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

Figure 2:
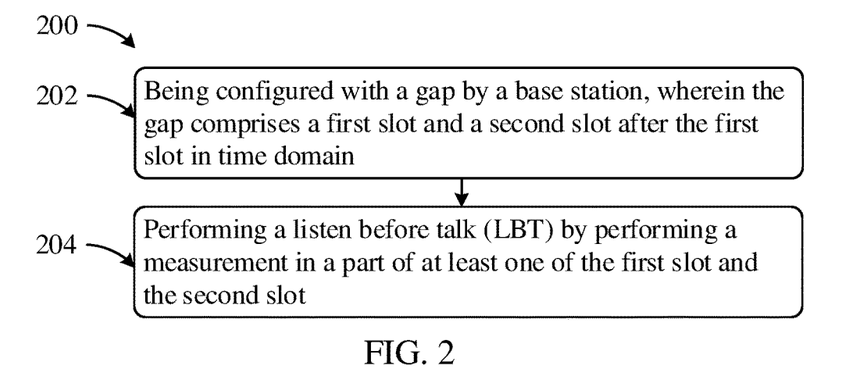
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure.

In some embodiments, the method 200 includes: a block 202, being configured with a gap by a base station, wherein the gap comprises a first slot and a second slot after the first slot in time domain, and a block 204, performing a listen before talk (LBT) by performing a measurement in a part of at least one of the first slot and the second slot. This can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

Figure 3:
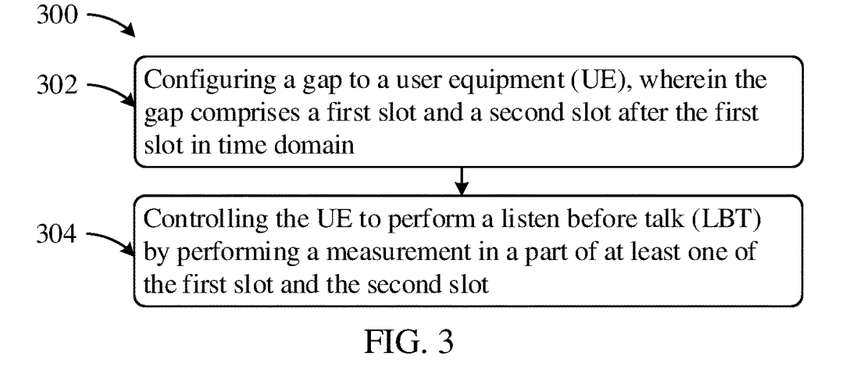
FIG. 3 is a flowchart illustrating a method of wireless communication performed by a base station according to an embodiment of the present disclosure.

FIG. 3 illustrates a method 300 of wireless communication by a base station according to an embodiment of the present disclosure.

In some embodiments, the method 300 includes: a block 302, configuring a gap to a user equipment (UE), wherein the gap comprises a first slot and a second slot after the first slot in time domain, and a block 304, controlling the UE to perform a listen before talk (LBT) by performing a measurement in a part of at least one of the first slot and the second slot. This can solve issues in the prior art, define a behavior of performing an LBT in a gap in time domain, provide a faire coexistence with other devices or technologies in an unlicensed spectrum, provide a turn-around interval for a device to switch from transmitter (Tx) to receiver (Rx) modes or from Rx to Tx modes, provide power consumption reduction for energy measurement, provide a good communication performance, and/or provide high reliability.

In some embodiments, the LBT is successful if a measured energy based on the measurement is lower than an energy detection (ED) threshold.

In some embodiments, the measurement is contiguous or non-contiguous in the time domain. In some embodiments, the LBT comprises an LBT category 2.

In some embodiments, the gap comprises a duration of 16 μs.

In some embodiments, one of the first slot and the second slot comprises a duration of 7 μs, and the other of the first slot and the second slot comprises a duration of 9 μs.

In some embodiments, when the first slot comprises the duration of 7 μs and the second slot comprises the duration of 9 μs, the measurement is performed in at least 4 μs of the second slot.

In some embodiments, when the first slot comprises the duration of 7 μs and the second slot comprises the duration of 9 μs, the measurement is performed in at least 4 μs of the first slot and the measurement is performed in at least 4 μs of the second slot, respectively.

In some embodiments, when the first slot comprises the duration of 7 μs and the second slot comprises the duration of 9 μs, the measurement is performed in at least x μs of the first slot and the measurement is performed in at least 4 μs of the second slot, respectively, where x is smaller than 4.

In some embodiments, x is equal to 1, 2, or 3.

In some embodiments, when the first slot comprises the duration of 9 μs and the second slot comprises the duration of 7 μs, the measurement is performed in at least 4 μs of the first slot and the measurement is performed in at least 4 μs of the second slot, respectively.

Some embodiments of the present disclosure provide methods of implementing an LBT category 2 with 16-μs gap. The following are some examples of implementing these methods.

Figure 4:
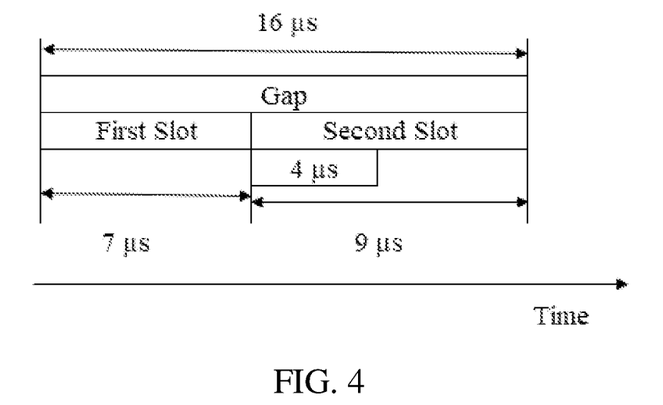
FIG. 4 is a schematic diagram illustrating a method of implementing a listen before talk (LBT) category 2 with 16-μs gap according to an embodiment of the present disclosure.

Example:

As illustrated in FIG. 4, an LBT category 2 with 16-μs gap (16-μs sensing interval) can be implemented by the followings. The 16-μs sensing interval is split into two slots with a first sensing slot having a duration of 7 μs and a second sensing slot having a duration of 9 μs. Energy measurement is done in the 9-μs sensing slot with the measurement including averaging for at least 4 µs in the 9-µs sensing slot. LBT is successful if a measured energy in the measurement is lower than an ED threshold. Note that the 4-µs measurement can be contiguous in time (i.e. contiguous 4 µs) or non-contiguous in time (accumulated 4 µs within the 9-µs sensing slot). The advantage of having 9-µs sensing slot at the end of the 16-µs sensing interval comprises that it can allow max 5-µs (i.e. the difference of 9 µs and 4 µs) turning-around time for a device to switch from receiver (Rx) mode to transmitter (Tx) mode.

Figure 5:
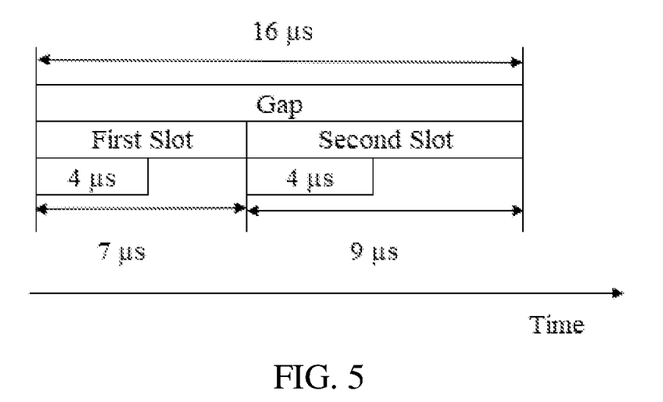
FIG. 5 is a schematic diagram illustrating a method of implementing a listen before talk (LBT) category 2 with 16-μs gap according to an embodiment of the present disclosure.

Example:

Alternatively, As illustrated in FIG. 5, an LBT category 2 with 16-µs sensing interval can be implemented by the followings. The 16-µs sensing interval is split into two slots with a first sensing slot having a duration of 7 µs and a second sensing slot having a duration of 9 µs. Energy measurement is done in both 7-µs sensing slot and 9-µs sensing slot, respectively, with the measurement including averaging for at least 4 µs in each of the first sensing slot and the second sensing slot. LBT is successful if a measured energy in the measurement is lower than an ED threshold. Note that the 4-µs measurement can be contiguous in time (i.e., contiguous 4 µs) or noncontiguous in time (accumulated 4 µs within each sensing slot). Compared with the above example, the advantage of this example comprises that a device won't miss potential transmission happened only in the first 7-µs sensing slot.

Figure 6:
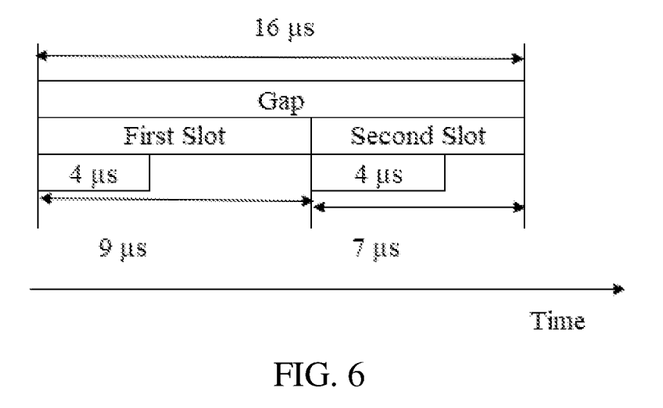
FIG. 6 is a schematic diagram illustrating a method of implementing a listen before talk (LBT) category 2 with 16-μs gap according to an embodiment of the present disclosure.

Example:

As illustrated in FIG. 6, as an alternative to the above example, 7-µs sensing slot and 9-µs sensing slot can be swapped, so that a device might have more turn-around time at the beginning of the 16-µs sensing interval.

Figure 7A:
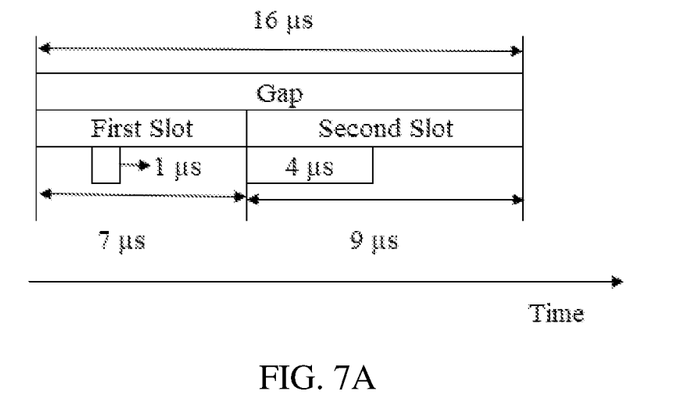
FIG. 7A is a schematic diagram illustrating a method of implementing a listen before talk (LBT) category 2 with 16-μs gap according to an embodiment of the present disclosure.
Figure 7B:
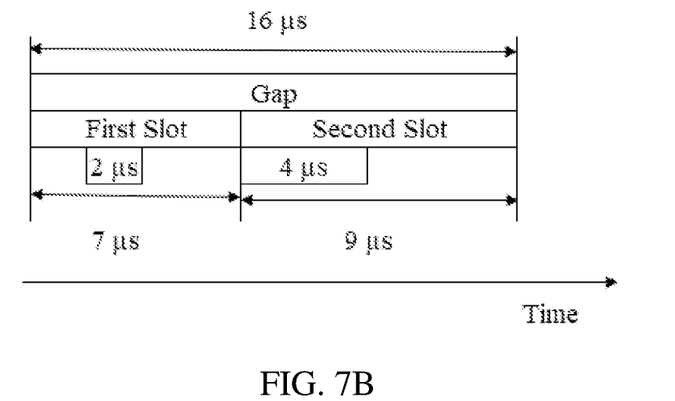
FIG. 7B is a schematic diagram illustrating a method of implementing a listen before talk (LBT) category 2 with 16-μs gap according to an embodiment of the present disclosure.
Figure 7C:
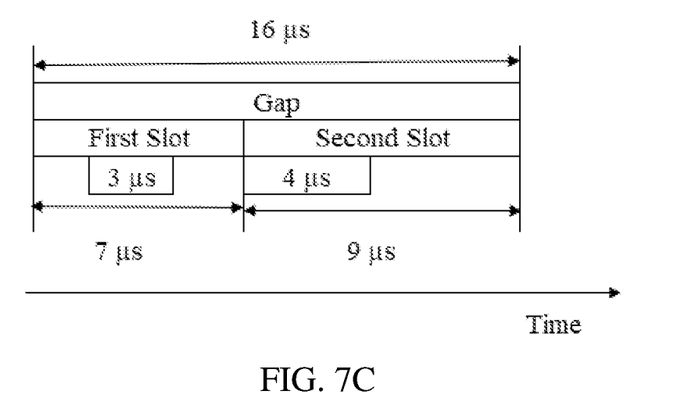
FIG. 7C is a schematic diagram illustrating a method of implementing a listen before talk (LBT) category 2 with 16-μs gap according to an embodiment of the present disclosure.

Example:

Alternatively, as illustrated in FIG. 7A, FIG. 7B, and FIG. 7C, an LBT category 2 with 16-µs sensing interval can be implemented by the followings. The 16-µs sensing interval is split into two slots with a first sensing slot having a duration of 7 µs and a second sensing slot having a duration of 9 µs. Energy measurement is done in both 7-µs sensing slot and 9-µs sensing slot, respectively. The 7-µs sensing slot in the measurement includes averaging for at least x µs, wherein x µs can be smaller than 4 µs (e.g., x µs can be 1 µs or 2 µs or 3 µs, as illustrated in FIG. 7A, FIG. 7B, and FIG. 7C). The 9-µs sensing slot in the measurement includes averaging for at least 4 µs. Note that the 4-µs measurement and x-µs measurement can be contiguous in time (i.e., contiguous 4 µs or x µs) or non-contiguous in time (accumulated 4 µs or x µs within each sensing slot). The advantage of this alternative comprises that the measurement in the 7-µs sensing slot might be for testing purpose, without the need to measure a long duration, leading to reduced power consumption for the energy measurement.

In summary, the methods disclosed in some embodiments of the present application (some examples as illustrated in FIG. 4 to FIG. 7C) can be used to achieve at least the followings:

1. Some examples can have a faire coexistence with other devices or technologies in the unlicensed spectrum.

2. Some examples can have a turn-around interval for device to switch from Tx to Rx modes or from Rx to Tx modes.

3. Some examples can have power consumption reduction for energy measurement.

Commercial interests for some embodiments are as follows. 1. Solving issues in the prior art. 2. Defining a behavior of performing an LBT in a gap in time domain. 3. Providing a faire coexistence with other devices or technologies in an unlicensed spectrum. 4. Providing a turn-around interval for a device to switch from transmitter (Tx) to receiver (Rx) modes or from Rx to Tx modes. 5. Providing power consumption reduction for energy measurement. 6. Providing a good communication performance. 7. Providing a high reliability. 8.

Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes.

Some embodiments of the present disclosure are a combination of "techniques/processes" that can be adopted in 3GPP specification to create an end product.

Some embodiments of the present disclosure could be adopted in the 5G NR unlicensed band communications.

Some embodiments of the present disclosure propose technical mechanisms.

Figure 8:
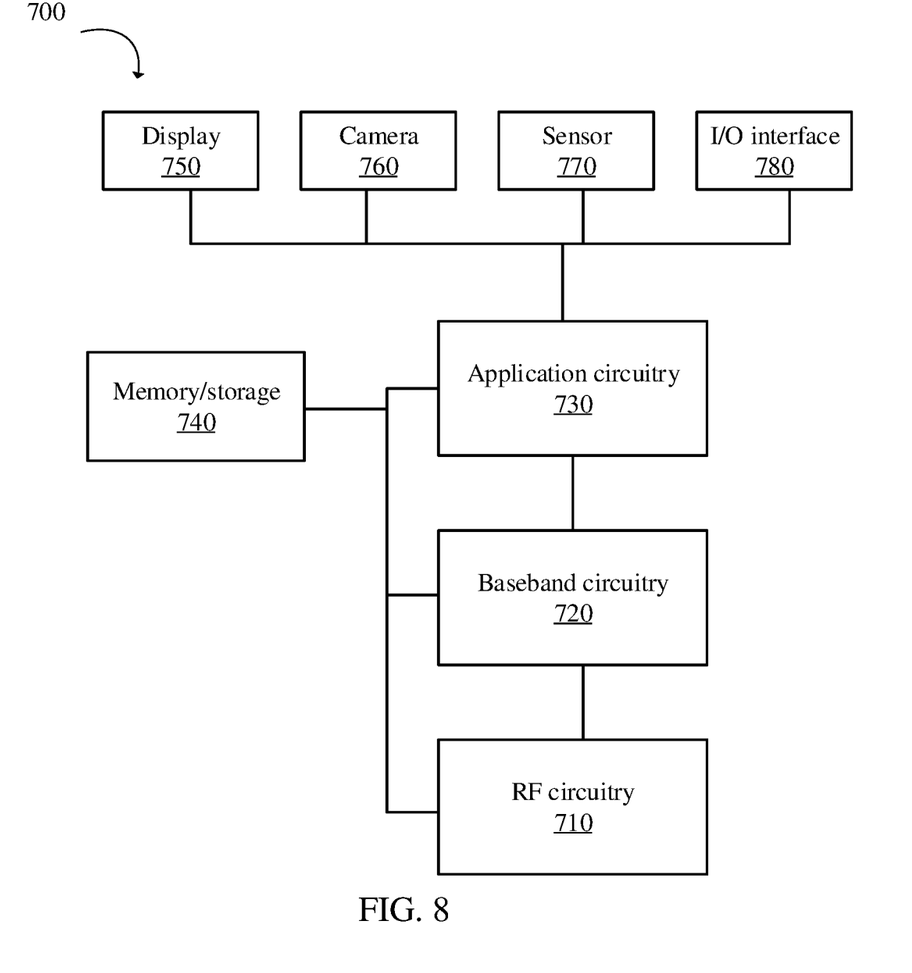
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc.

In some embodiments, the baseband circuitry may provide for communication compatible with one or more radio technologies.

For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN).

Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency.

For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium.

In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency.

For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display.

In various embodiments, the system 700 may be a mobile computing device such as, but not limited to, a laptop computing device, a tablet computing device, a netbook, an ultrabook, a smartphone, an AR/VR glasses, etc.

In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways.

The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

being configured with a gap by a base station, wherein the gap comprises a first slot and a second slot after the first slot in time domain; and
performing a listen before talk (LBT) by performing a measurement in a part of at least one of the first slot and the second slot;
wherein one of the first slot and the second slot comprises a duration of 7 microseconds (µs), and the other of the first slot and the second slot comprises a duration of 9 µs; and
wherein when the first slot comprises the duration of 7 µs and the second slot comprises the duration of 9 µs, the measurement is performed in at least 4 µs of the second slot.

2. The method of claim 1, wherein the LBT is successful if a measured energy based on the measurement is lower than an energy detection (ED) threshold.

3. The method of claim 1, wherein the measurement is contiguous or non-contiguous in the time domain.

4. The method of claim 1, wherein the LBT comprises an LBT category 2.

5. The method of claim 1, wherein the gap comprises a duration of 16 µs.

6. The method of claim 1, wherein when the first slot comprises the duration of 7 µs and the second slot comprises the duration of 9 µs, the measurement is performed in at least 4 µs of the first slot and the measurement is performed in at least 4 µs of the second slot, respectively.

7. The method of claim 1, wherein when the first slot comprises the duration of 7 µs and the second slot comprises the duration of 9 µs, the measurement is performed in at least x µs of the first slot and the measurement is performed in at least 4 µs of the second slot, respectively, where x is smaller than 4.

8. The method of claim 7, wherein x is equal to 1, 2, or 3.

9. The method of claim 1, wherein when the first slot comprises the duration of 9 µs and the second slot comprises the duration of 7 µs, the measurement is performed in at least 4 µs of the first slot and the measurement is performed in at least 4 µs of the second slot, respectively.

10. A wireless communication method by a base station, comprising:
configuring a gap to a user equipment (UE), wherein the gap comprises a first slot and a second slot after the first slot in time domain; and
controlling the UE to perform a listen before talk (LBT) by performing a measurement in a part of at least one of the first slot and the second slot;
wherein one of the first slot and the second slot comprises a duration of 7 microseconds (µs), and the other of the first slot and the second slot comprises a duration of 9 µs; and
wherein when the first slot comprises the duration of 7 µs and the second slot comprises the duration of 9 µs, the measurement is performed in at least 4 µs of the second slot.

11. The method of claim 10, wherein the LBT is successful if a measured energy based on the measurement is lower than an energy detection (ED) threshold.

12. The method of claim 10, wherein the measurement is contiguous or non-contiguous in the time domain.

13. The method of claim 10, wherein the LBT comprises an LBT category 2.

14. The method of claim 10, wherein the gap comprises a duration of 16 µs.

15. The method of claim 10, wherein when the first slot comprises the duration of 7 µs and the second slot comprises the duration of 9 µs, the measurement is performed in at least 4 µs of the first slot and the measurement is performed in at least 4 µs of the second slot, respectively.

16. The method of claim 10, wherein when the first slot comprises the duration of 7 µs and the second slot comprises the duration of 9 µs, the measurement is performed in at least x µs of the first slot and the measurement is performed in at least 4 µs of the second slot, respectively, where x is smaller than 4.

17. The method of claim 16, wherein x is equal to 1, 2, or 3.

18. The method of claim 10, wherein when the first slot comprises the duration of 9 µs and the second slot comprises the duration of 7 µs, the measurement is performed in at least 4 µs of the first slot and the measurement is performed in at least 4 µs of the second slot, respectively.

19. A user equipment (UE), comprising:
a memory;
a transceiver; and
a processor coupled to the memory and the transceiver;
wherein the processor is configured with a gap by a base station, the gap comprises a first slot and a second slot after the first slot in time domain; and
wherein the processor is configured to perform a listen before talk (LBT) by performing a measurement in a part of at least one of the first slot and the second slot;
wherein one of the first slot and the second slot comprises a duration of 7 microseconds (µs), and the other of the first slot and the second slot comprises a duration of 9 µs; and
wherein when the first slot comprises the duration of 7 µs and the second slot comprises the duration of 9 µs, the measurement is performed in at least 4 µs of the second slot.

20. A base station, comprising:
a memory;
a transceiver; and
a processor coupled to the memory and the transceiver;
wherein the processor is configured to configure a gap to a user equipment (UE), the gap comprises a first slot and a second slot after the first slot in time domain;
wherein the processor is configured to control the UE to perform a listen before talk (LBT) by performing a measurement in a part of at least one of the first slot and the second slot;
wherein one of the first slot and the second slot comprises a duration of 7 microseconds (µs), and the other of the first slot and the second slot comprises a duration of 9 µs; and
wherein when the first slot comprises the duration of 7 µs and the second slot comprises the duration of 9 µs, the measurement is performed in at least 4 µs of the second slot.

* * * * *